E. A. BLY.
WAGON BRAKE SHOE.
APPLICATION FILED JUNE 14, 1917.
1,246,386.
Patented Nov. 13, 1917.
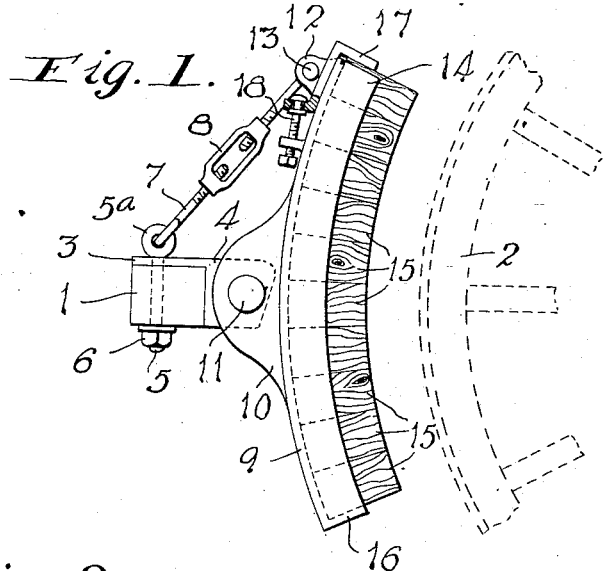
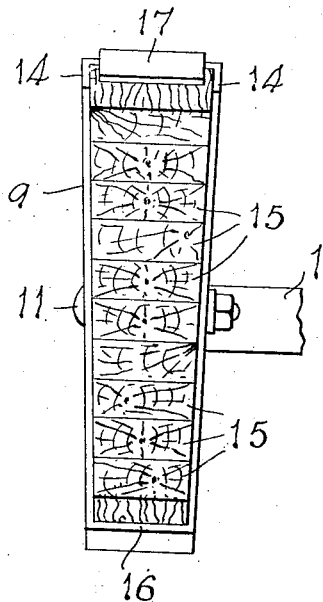
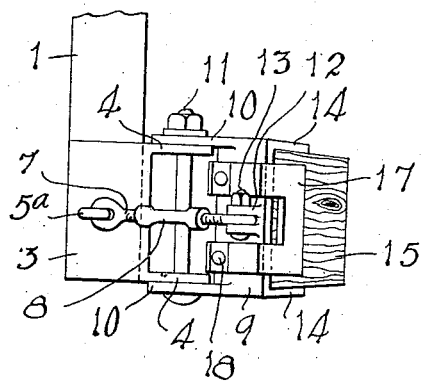
Inventor
E. A. BLY
By H. S. Kier
Attorney

UNITED STATES PATENT OFFICE.

ELMER A. BLY, OF PORTLAND, OREGON.

WAGON-BRAKE SHOE.

1,246,386.   Specification of Letters Patent.   Patented Nov. 13, 1917.

Application filed June 14, 1917.   Serial No. 174,726.

*To all whom it may concern:*

Be it known that I, ELMER A. BLY, a citizen of the United States, residing at Portland, in the county of Multnomah, State of Oregon, have invented a new and useful Wagon-Brake Shoe; and I do hereby declare the following to be a full, clear, and exact description of the invention, such as will enable others skilled in the art to which it appertains and make and use the same.

The present invention relates to a wagon brake, and has for its object to provide a device of this character which embodies novel features of construction whereby the brake shoe can be quickly set at the proper angle for obtaining the most effective engagement with the wheel, and which also admits of the wooden filler blocks being easily replaced by an unskilled workman when they become worn.

Further objects of the invention are to provide a wagon brake which is comparatively simple and inexpensive in its construction, which can be mounted without difficulty upon any conventional brake beam and used in connection with the conventional vehicle wheels, which is not liable to become damaged or broken when not in use, and which enables the wooden filler blocks to be easily fitted in position with the grain of the wood running transversely so that they will give a maximum amount of wear and firmly grip the wheel when moved into engagement therewith.

With these and other objects in view, the invention consists in certain novel combinations and arrangements of the parts as will more fully appear as the description proceeds, the novel features thereof being pointed out in the appended claim.

For a full understanding of the invention, reference is to be had to the following description and accompanying drawings, in which :—

Figure 1 is a side elevation of a brake shoe constructed in accordance with the invention.

Fig. 2 is a front elevation thereof.

Fig. 3 is a top plan view thereof.

Corresponding and like parts are referred to in the following description and indicated in all the views of the drawings by the same reference characters.

Referring to the drawings, which illustrate one embodiment of the invention, the numeral 1 designates a brake beam which is of the conventional construction and may be mounted in the usual manner, and 2 a vehicle wheel which is also of the conventional construction. An angle plate 3 is applied to the brake beam 1 and arranged to fit over the top at one side thereof, said angle plate being provided at its sides with pivot ears 4, and being secured in position by a vertically disposed bolt 5 which passes through the top of the angle plate 3 and the brake beam 1. A clamping nut 6 is threaded upon the lower end of the bolt 5 and serves to lock the bolt and angle plate firmly in position. The head $5^a$ of the bolt has a brace 7 hingedly connected thereto, said brace being formed in sections which are connected by a turn-buckle 8 so that the effective length of the brace can be lengthened or shortened, as desired.

The brake shoe 9 has a segmental shape, being curved to conform to the periphery of the vehicle wheel 2. The back of the brake shoe is provided with rearwardly extending side wings 10 which embrace the pivot ears 4 of the angle plate 3 and are connected thereto by a pivot bolt 11. These side wings 10 are positioned at an intermediate point in the length of the brake shoe 9, and the upper end of the brake shoe is provided with rearwardly extending lugs 12 which are pivotally connected at 13 to the end of the brace 7. With this construction it will be obvious that by manipulating the turnbuckle 8 and regulating the length of the brace 7 the brake shoe 9 can be swung about the pivot bolt 11 as a center and set at the proper angle for squarely engaging the vehicle wheel 2 when moved against the same.

The outer face of the brake shoe 9 is provided with side flanges 14 which converge outwardly toward each other and diverge slightly from the lower end of the brake shoe to the upper end thereof. A longitudinally extending dovetail channel is thus provided upon the concave face of the brake shoe, said channel gradually becoming wider toward the top of the shoe. A series of small wooden filler blocks 15 are fitted in the dovetail channel provided by the side flanges 14 and arranged with the grain of the wood extending transversely of the brake shoe in order that they may the more readily resist wear. These wooden filler blocks are slipped into the flared upper end of the channel and forced downwardly into proper position therein, being securely gripped and held by the side flanges 14. At the lower end of the brake shoe this dovetail channel is closed by an integral or fixed stop 16, while a suitable cap 17 may be provided for engaging the uppermost filler block 15 to hold the filler blocks in proper position within the dovetail channel when the brake is in use. This cap piece 17 may be formed with a flange which fits against the back of the shoe and is engaged by a fastening member 18 by means of which it can be brought into a forcible engagement with the filler blocks after they have been placed in position, thereby holding them tightly together without looseness or play. When the filler blocks become worn they can be readily driven upwardly through the flared end of the dovetail channel, and replaced by a series of new filler blocks. It is merely necessary to cut a series of short blocks, and when they are assembled within the dovetail channel of the brake shoe 9 they provide a composite block which fits the wheel and will tightly grip the same in the most effective manner. These short blocks can be cut and prepared by an unskilled workman, and the necessity of preparing a large block and fitting it in the usual manner to the brake shoe and wheel is eliminated. This is an important advantage since it enables a vehicle owner living upon a farm or in a rural district to repair his own brake without difficulty or loss of time, and without the expense and delay which would be incident to carrying his wagon to a repair shop and obtaining the services of a skilled workman.

Having thus described the invention, what I claim as new and desire to secure by Letters Patent, is:—

A wagon brake including an angle plate adapted to be fitted against the top and side of a brake beam, a securing bolt extending through the top flange of the angle plate, a brake shoe pivotally connected at an intermediate point in its length to the side flange of the angle plate, a diagonal brace having one end thereof pivotally connected to the head of the securing bolt while the opposite end thereof is pivotally connected to one end of the brake shoe, and a turnbuckle interposed in the length of the diagonal brace for regulating the effective length thereof to set the brake shoe at different angles.

In testimony whereof I have signed my name to this specification in the presence of two subscribing witnesses.

ELMER A. BLY.

Witnesses:
J. H. LAMBERT,
L. B. SMITH.